United States Patent [19]

Horansky et al.

[11] Patent Number: 4,737,893
[45] Date of Patent: Apr. 12, 1988

[54] HEADLIGHT DOOR ACTUATING MECHANISM

[75] Inventors: John Horansky, Sterling Heights; Gerald W. Szymczak, Warren; John H. Schult, Jr., Royal Oak, all of Mich.

[73] Assignee: Chrysler Motors Corporation, Highland Park, Mich.

[21] Appl. No.: 86,424

[22] Filed: Aug. 17, 1987

[51] Int. Cl.4 .................................... F21V 17/00
[52] U.S. Cl. ..................................... 362/64; 362/284; 74/20; 74/96
[58] Field of Search .............. 362/64, 65, 80–83, 362/60, 61, 66–71, 277, 282, 427, 428, 311, 375, 325; 74/20, 96; 315/82; 280/152 R

[56] References Cited

U.S. PATENT DOCUMENTS

| | | | |
|---|---|---|---|
| 2,324,742 | 7/1943 | Voorhees et al. | 362/64 |
| 2,700,725 | 1/1955 | Morphew et al. | 362/64 |
| 3,070,687 | 12/1962 | Marchant | 362/64 |
| 3,504,168 | 3/1970 | Johnson et al. | 362/64 |
| 3,522,422 | 8/1970 | Dukatz et al. | 362/64 |
| 3,601,594 | 8/1971 | Carbary | 362/64 |
| 4,310,872 | 1/1982 | Lauve | 362/284 |
| 4,516,191 | 5/1985 | Moriyama et al. | 362/65 |
| 4,605,991 | 8/1986 | Fylan | 362/64 |
| 4,639,839 | 1/1987 | Miyazawa | 362/64 |

Primary Examiner—James C. Yeung
Attorney, Agent, or Firm—Edward A. Craig

[57] ABSTRACT

A door actuating mechanism is provided for opening and closing of door structures over recessed headlights in a vehicle. The actuating mechanism includes means to cause pivoting of the doors to the open or closed positions and simultaneous sliding of the doors sideways with respect to the opening for the recessed headlights to prevent engagement of the doors with the side edges of the opening during opening and closing of the door.

5 Claims, 2 Drawing Sheets

HEADLIGHT DOOR ACTUATING MECHANISM

BACKGROUND OF THE INVENTION

1. Field of the Invention:

The invention relates to a mechanism for actuating the doors covering recessed headlights of a vehicle to the open and closed positions.

2. Prior Art:

Mechanisms for operating the doors of recessed vehicle headlamps to open or close have been widely used in the past. Such mechanisms are shown, for example, in U.S. Pat. Nos. 2,324,742, Voorhees, June 20, 1943; 2,700,725, Morphew et al, Jan. 25, 1955; 3,070,687, Marchant, Dec. 25, 1962; and 3,601,594, Carbary, Aug. 24, 1971. The headlight doors shown in these patents have been, broadly, symmetrical about a vertical axis so that it has been possible to open and retract the doors into the headlight recess in a relatively straightforward manner.

However, in the present invention, the headlight door is not symmetrical about a vertical axis. It is desired, from a design standpoint, to provide the door in the form of a non-right angle parallelogram. This has been done for design effect. The headlights are recessed into vehicle panel structure which is angled rearwardly from the front of the vehicle towards the side of the vehicle or, from an inboard point of the vehicle to an outboard point of the vehicle. This has been done so that when the front end of the vehicle is viewed from the front of the vehicle, the headlamp doors will give the optical illusion of being rectangular. Because of the slant of the panel structure in which the doors are mounted, if the openings were actually rectangular, they would appear to be non-right angle parallelograms when viewed from the front of the vehicle. This is considered to be visually objectionable.

However, as a consequence of this arrangement, the doors are not symmetrical about a vertical axis. This geometry results in making it impossible to retract the doors about an axis which is perpendicular to the side edges of the door and at the same time to fully retract the doors into the recesses. A portion of the doors would always project out of the recesses if the axes of retraction were at right angles to the edges of the doors. On the other hand, if a horizontal axis were chosen, the doors would move in a sideward direction with respect to the side edges of the opening into which they are mounted during the retracting process. This would cause interference of the side edges of the doors with the side edges of the openings as the doors are retracted. In order to solve this problem, in accordance with the present invention, the doors are retracted about a horizontal axis so that they will be entirely recessed into the headlamp recesses when they are retracted. But, during the retracting process, the doors are simultaneously moved sidewardly so that they will not interfere with the edges of the openings in which the headlamps are recessed.

SUMMARY OF THE INVENTION

The headlight door actuating mechanism of the present invention is provided in a vehicle which has front and body panel structure defining a pair of openings. A pair of headlights are recessed in the openings. Each opening is closed by a pivotal door when the headlights are turned off. The doors are pivotable to an open position when the headlights are turned on. The body panel structure includes two sections, each of which is angled rearwardly and outwardly from a point inboard of the outboard side of the vehicle. One of the openings is provided in each of the sections. Each opening is configured in the general shape of a non-right angle parallelogram including non-vertical side edges which appear to be vertical which when viewed from the front of the vehicle.

The door actuating mechanism for each door includes journal means. A pivotable and axially slidable crankshaft is received in the journal means and is fixedly attached at one end to the door. The axis of rotation of the crankshaft is at other than a 90° angle with respect to the side edges of the opening in the body panel structure. Drive means are connected to the crankshaft for selectively pivoting the crankshaft to open or close the door in a vertical direction and simultaneously slide the crankshaft sideways with respect to the opening to prevent engagement of the door with the side edges of the opening in the body panel structure during opening and closing of the door. Preferably, a crank is provided which is fixedly attached at one end to the crankshaft and at the other end to the door.

The crankshaft is axially slidably connected to the drive means and includes a cam follower extending radially outwardly therefrom. A cam structure is fixedly mounted on vehicle structure and is at least partially surrounds the crankshaft. The cam structure includes a cam slot. The cam follower extends into the cam slot. The cam slot is angled axially with respect to the crankshaft whereby the crankshaft is slid in one direction upon opening of the door and is slid in the opposite direction upon closing of the door. The drive means includes an electric motor. The output of the motor is drivingly connected to the crankshaft of the door actuating mechanism of each door whereby the doors are opened and closed simultaneously. The means for so connecting the drive means to the crankshaft comprise a torsion bar.

DETAILED DESCRIPTION OF A PREFERRED EMBODIMENT

Figure 1:
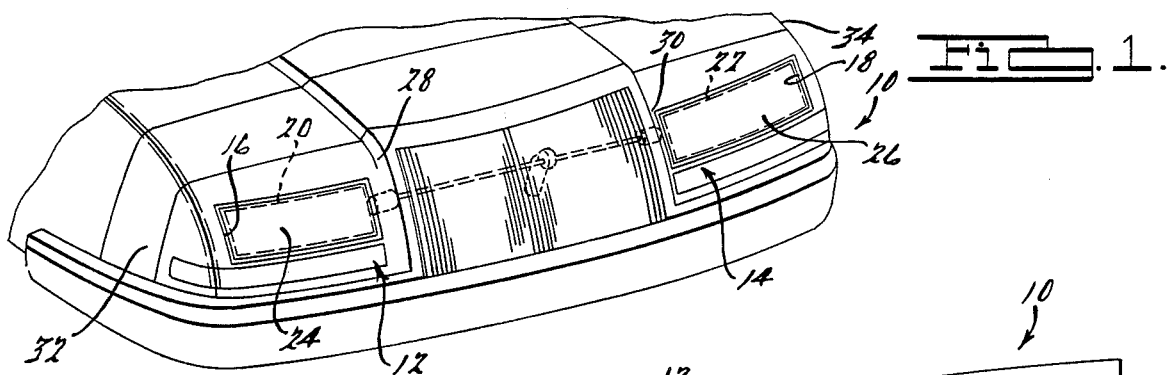
FIG. 1 is a front end view of a vehicle including the recessed headlamps of the present invention.
Figure 2:
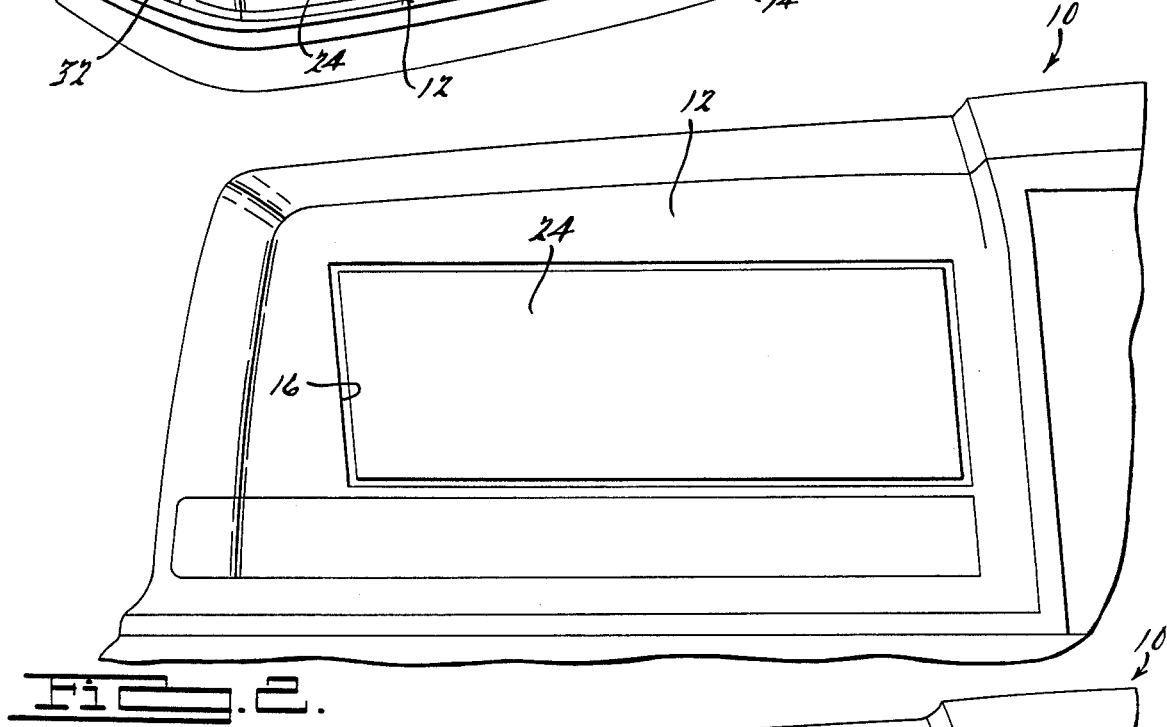
FIG. 2 is a front elevational view of the left side of the vehicle illustrating the visual appearance of the headlight recess and door as viewed from an angle perpendicular to the plane thereof.
Figure 3:
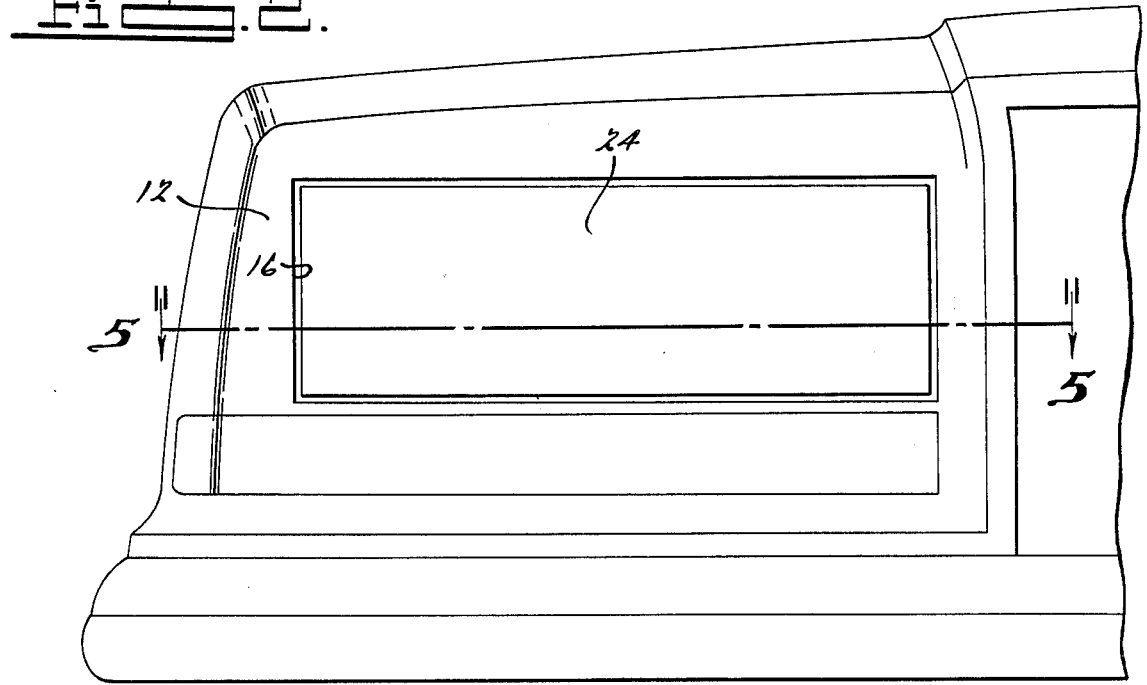
FIG. 3 is a view similar to FIG. 1 illustrating the appearance of the headlight recess as viewed from a position directly in front of the vehicle.

The problem with which the present invention is concerned may best be understood by reference to FIGS. 1-3. As will be noted in FIG. 1, a vehicle 10 is provided with front and body panel structure including two sections 12, 14 which define a pair of openings 16, 18. A pair of headlights 20, 22 are recessed in the openings 16, 18. Each opening is closed by means of a pivotable and slidable door 24, 26 when the headlights are turned off. The doors 24, 26 are pivotable and slidable to an open position when the headlights are turned on.

Each of the sections 12, 14 is angled rearwardly and outwardly from a point 28, 30 inboard of the outboard vehicle sides 32, 34. Each of the openings is configured in the general shape of a non-right angle parallelogram (FIG. 2) including non-vertical side edges which appear to be vertical when viewed from the front of the vehicle as will be noted in FIG. 3. The upper edges of the openings are generally horizontal and appear to be so from all angles. As will be appreciated, if the doors 24, 26 are rotated about an axis which is perpendicular to the side edges, they will be retracted into the recesses without touching the side edges of the openings 16, 18. However, with such an axis of rotation, the lower right edge of the left door, for example, would project out of the recess upon being retracted and this would be visually objectionable. Therefore, it is desired to use an axis of rotation which is parallel to the bottom edge of the doors and openings so that the doors will be uniformly retracted into the recesses. However, in this event, the doors would impinge against the side edges of the openings when they have been pivoted about half-way. This is graphically illustrated in FIG. 5 wherein the side edges of the openings are illustrated by the dotted lines 36, 38. Rotation about the axis illustrated by the dotted line 40 will clearly result in interference of the door structure with the slde edges of the openings. To overcome this problem, structure is provided to shift the doors sidewardly as they are retracted.

Figure 4:
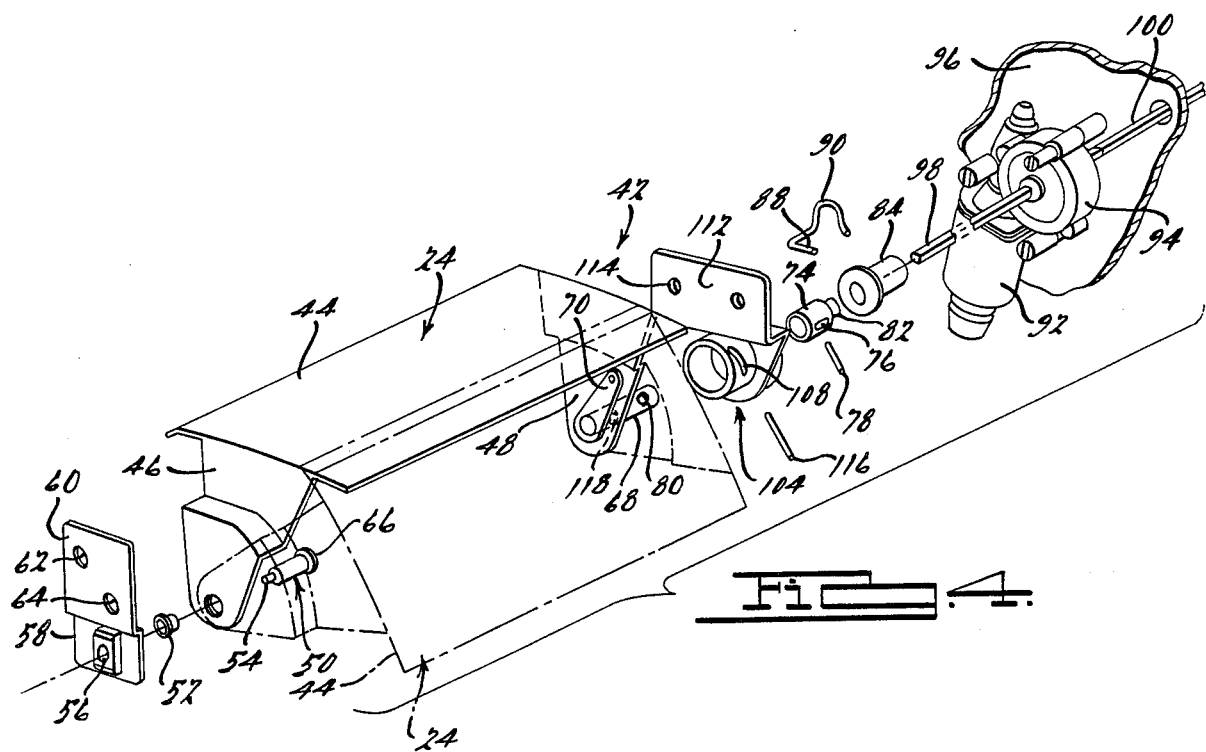
FIG. 4 is an exploded view in perspective of one embodiment of the vehicle headlight door actuating mechanism.
Figure 5:
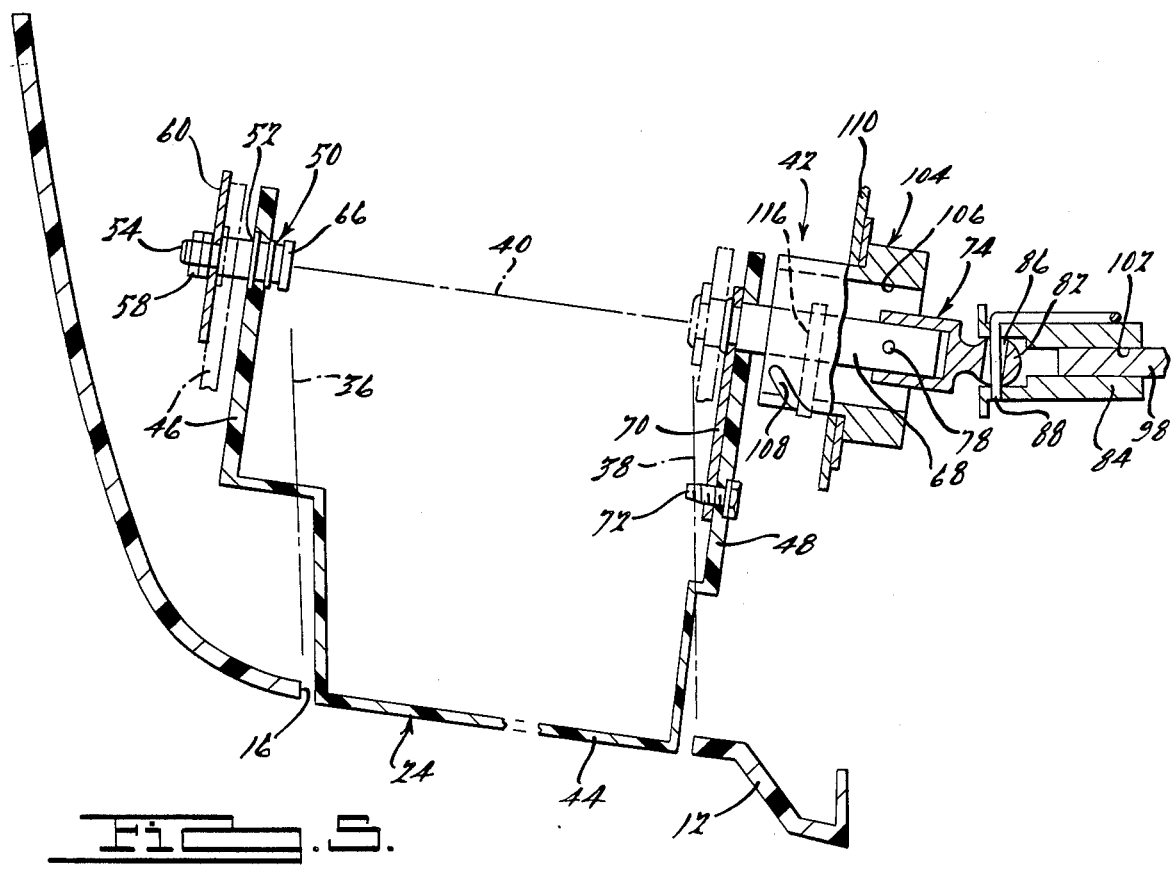
FIG. 5 is a sectional view taken substantially along the line 5—5 of FIG. 3 looking in the direction of the arrows.

The door actuating mechanism 42 is illustrated in FIGS. 4 and 5. One of these mechanisms is provided for each door. As will be noted, the doors comprise a front closure panel 44 which has end bracket structures 46, 48. The bracket structures are suitable journaled for pivotal and sliding motion. The left end of the door as viewed in FIGS. 4 and 5 is journaled by means of pin 50 which extends through an opening in bearing member 52, the bearing member 52 being secured within an opening in the bracket 46. The outer end 54 of the pin 50 is of reduced diameter and is threaded. The end 54 is threadingly received within an internally threaded opening 56 of a nut structure 58 provided on a mounting bracket 60. The mounting bracket 60 has openings 62, 64 through which fastening means extend to secure the bracket to internal vehicle panel structure (not shown). An enlarged head 66 is provided on the inner end of the pin 50 to prevent disengagement of the pin from the door bracket 46. As will be appreciated, the left end of the door structure is free to pivot and slide on the pin 50.

The right hand side of the door, as viewed in FIGS. 4 and 5, is journaled by means a crankshaft 68 which is secured to a crank 70, the crank 70 being fixed to the bracket 48 by means of fastener 72. The crankshaft 68 is received in a ball joint actuator 74. A slot 76 is formed in the sleeve portion of actuator 74. A pin 78 extends through the slot 76 and is force fitted into an opening 80 provided in the crankshaft 68. It will thus be appreciated that the crankshaft is free to slide axially in the actuator 74 within the limits of the length of the slot 76. A ball element 82 is provided on actuator 74. Element 82 is received in an end recess of a sleeve actuator 84.

The ball element 82 has an opening 86 therethrough. Registering openings are provided in the end of the sleeve actuator 84. A pin 88 extends through the openings in the sleeve actuator 84 and through the opening 86 in the ball element 82. The pin 88 carries spring clasp 90 which is received on the sleeve actuator 84 to hold the pin 88 in place. The diameter of the opening 86 is greater than the diameter of the pin 88 whereby the ball element 82 is thereby free to pivot as shown with respect to the sleeve actuator 84 so that the axis 40 of the door as defined by the crankshaft 68 and pin 50 can be, as shown in FIG. 5, parallel to the door front closure panel 44. This requires that the axis 40 have an angular relationship with the axis of the sleeve actuator 84. The ball element 82 is free to have limited pivoting within the sleeve actuator 84 to accomplish this end. As will be appreciated by reference to FIG. 5, the axis of rotation of the crankshaft 68 is at other than a 90° angle with respect to the side edges of the opening in the body panel structure as represented by the dotted lines 36, 38.

Drive means, in the form of an electric motor 92 and gear box 94, are suitably mounted on vehicle panel structure 96. The output of the gear box 94 is connected to a pair of torsion bars 98, 100. The torsion bars are substantially square in cross section and are received in similarly configured openings 102 provided in the sleeve actuators 84, it being appreciated that the same actuator means are provided for each of the doors 24, 26. The motor 92 is energized to turn the torsion bars 98, 100 by suitable switching means upon turning the headlights on or off as is well known in the art. Rotation of the torsion bars 98, 100 causes rotation of the sleeve actuators 84 which in turn causes rotation or pivoting of the crankshafts 68 and thus pivoting of the doors to the open or closed position.

As previously discussed, the doors must be slid sidewardly during this pivoting action to avoid interference with the openings 16, 18. This is accomplished by a cam structure in the form of a cylindrical cam element 104 which has a central opening 106 therethrough. The crankshaft 68 and sleeve actuator 84 extend through the opening 106. The cam element 104 is suitably connected to vehicle panel structure 110 by means of a flange 112 having opening means 114 therein to receive fasteners for securement to the panel 110. A pin 116 extends through the cam slot 108 and is forced fitted into an opening 118 in the crankshaft 68. As will be appreciated, upon pivoting of the crankshaft 68, the pin 116 which forms a cam follower, will cause the crankshaft 68 to slide sidewardly to the left as viewed in FIG. 5, thus moving the door to the left and avoiding contact with the door opening upon pivoting of the door to the open position. The provision of the pin 78 and slot 76 arrangement permits the crankshaft 68 to slide in the ball joint actuator 74. As shown in FIG. 5 in dotted lines, the door brackets 46, 48 slide to the left upon pivoting of the door to the open position. On closure of the door the cam slot 108 causes the door to move back to its original position is shown in FIG. 4.

We claim:

1. In a vehicle provided with front end body panel structure defining a pair of openings, a pair of headlights recessed in the openings, each opening being closed by a pivotable door when the headlights are turned off, the doors being pivotable to an open position when the headlights are turned on, the body panel structure including two sections each of which is angled rearwardly and outwardly from a point inboard of the outboard sides of the vehicle, one of the openings being provided in each of the sections, each opening being configured in the general shape of a non-right angle parallelogram including non-vertical side edges which appear to be vertical when viewed from the front of the vehicle, the improvement comprising a door actuating mechanism for each door, each door actuating mechanism including a pivotable and axially slidable crankshaft fixedly attached at on end to the door, the axis of rotation of the crankshaft being at other than a 90° angle with respect to the side edges of the opening in the body panel structure, drive means connected to the crankshaft for selectively pivoting the crankshaft to open or close the door in a vertical direction and simultaneously slide the crankshaft sideways with respect to said opening to prevent engagement of the door with the side edges of the opening in the body panel structure during opening and closing of the door.

2. The combination of claim 1, further characterized in the provision of a crank fixedly attached at one end to the crankshaft and at the other end to the door.

3. The combination of claim 1, further characterized in that the crankshaft is axially slidably connected to the drive means and includes a cam follower extending radially outwardly therefrom, a cam structure fixedly mounted on vehicle structure and at least partially surrounding the crankshaft, the cam structure including a cam slot, the cam follower extending into the cam slot, the cam slot being angled axially with respect to the crankshaft whereby the crankshaft is slid in one direction upon opening of the door and is slid in the opposite direction upon closing of the door.

4. The combination of claim 1, further characterized in that the drive means includes an electric motor, the output of the motor being drivingly connected to the crankshaft of the door actuating mechanism of each door whereby the doors are opened and closed simultaneously.

5. The combination of claim 4, further characterized in that the output of the motor is drivingly connected to the crankshafts by means of a torsion bar.

* * * * *